US008737960B2

(12) United States Patent
Kim et al.

(10) Patent No.: US 8,737,960 B2
(45) Date of Patent: May 27, 2014

(54) INTERFACE SYSTEM OF SUBSCRIBER INFORMATION MANAGEMENT, BILLING, PREPAID SYSTEM FOR MOBILE NETWORK SYSTEM, AND PREPAID METHOD USING THE INTERFACE SYSTEM

(75) Inventors: Yon-Hee Kim, Seoul (KR); Tae-Ho Oh, Seoul (KR); Young-In Cha, Seoul (KR); Gi-Seon Nam, Seoul (KR); O-Hyon Kwon, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 1669 days.

(21) Appl. No.: 11/573,966

(22) PCT Filed: Aug. 19, 2005

(86) PCT No.: PCT/KR2005/002741
§ 371 (c)(1),
(2), (4) Date: Apr. 16, 2008

(87) PCT Pub. No.: WO2006/019282
PCT Pub. Date: Feb. 23, 2006

(65) Prior Publication Data
US 2008/0228610 A1    Sep. 18, 2008

(30) Foreign Application Priority Data

Aug. 20, 2004 (KR) .................. 10-2004-0065870
Aug. 20, 2004 (KR) .................. 10-2004-0065871
Sep. 1, 2004 (KR) .................. 10-2004-0069623

(51) Int. Cl.
*H04W 4/24* (2009.01)
(52) U.S. Cl.
USPC ........... 455/410; 455/405; 455/406; 455/407; 455/411
(58) Field of Classification Search
USPC .................. 455/410, 411; 705/39, 40, 51, 67
See application file for complete search history.

(56) References Cited

U.S. PATENT DOCUMENTS 7,958,238 B1 * 6/2011 Batz et al. ............ 709/225
2002/0052754 A1   5/2002 Joyce
(Continued)

FOREIGN PATENT DOCUMENTS

CN   101044779   5/2011
KR   1020020003128   1/2002
(Continued)

OTHER PUBLICATIONS

International Search Report of PCT/KR2005/002741.
(Continued)

*Primary Examiner* — Patrick Edouard
*Assistant Examiner* — Julio Perez
(74) *Attorney, Agent, or Firm* — Lowe Hauptman & Ham, LLP

(57) ABSTRACT

Disclosed are an interface architecture of subscriber information management, billing, prepaid system for mobile network system, and a prepaid method using the interface architecture. The present invention is embodied by a Workflow engine classified as a business logic and a processing logic to access the interface rapidly for clients. The workflow engine is applicable to the subscriber information management and the billing through a voice subscriber, a data subscriber and contents provider. Interfacing is possible to apply changeable embodiment of system and adapt environment changes through a workflow engine. Therefore, the present invention provides a wireless portal platform to increase efficiency in subscribing procedures and using service. In addition, the present invention provides solution of obstacles on respective module between the prepaid billing client and the prepaid billing gateway, or between the prepaid billing gateway and the prepaid billing server.

36 Claims, 6 Drawing Sheets

(56) References Cited

U.S. PATENT DOCUMENTS

| | | | |
|---|---|---|---|
| 2002/0120519 A1* | 8/2002 | Martin et al. | 705/21 |
| 2002/0161723 A1 | 10/2002 | Asokan | |
| 2004/0078332 A1* | 4/2004 | Ferguson et al. | 705/41 |
| 2004/0139204 A1* | 7/2004 | Ergezinger et al. | 709/229 |

FOREIGN PATENT DOCUMENTS

| | | |
|---|---|---|
| KR | 1020020008980 | 2/2002 |
| KR | 1020020063346 | 8/2002 |
| KR | 1020040046293 | 6/2004 |

OTHER PUBLICATIONS

Vietnamese Office Action for 1-2007-00598 dated Aug. 31, 2011.
Korean Office Action for application No. 10-2004-0065870.
Korean Office Action for application No. 10-2004-0065871.

* cited by examiner

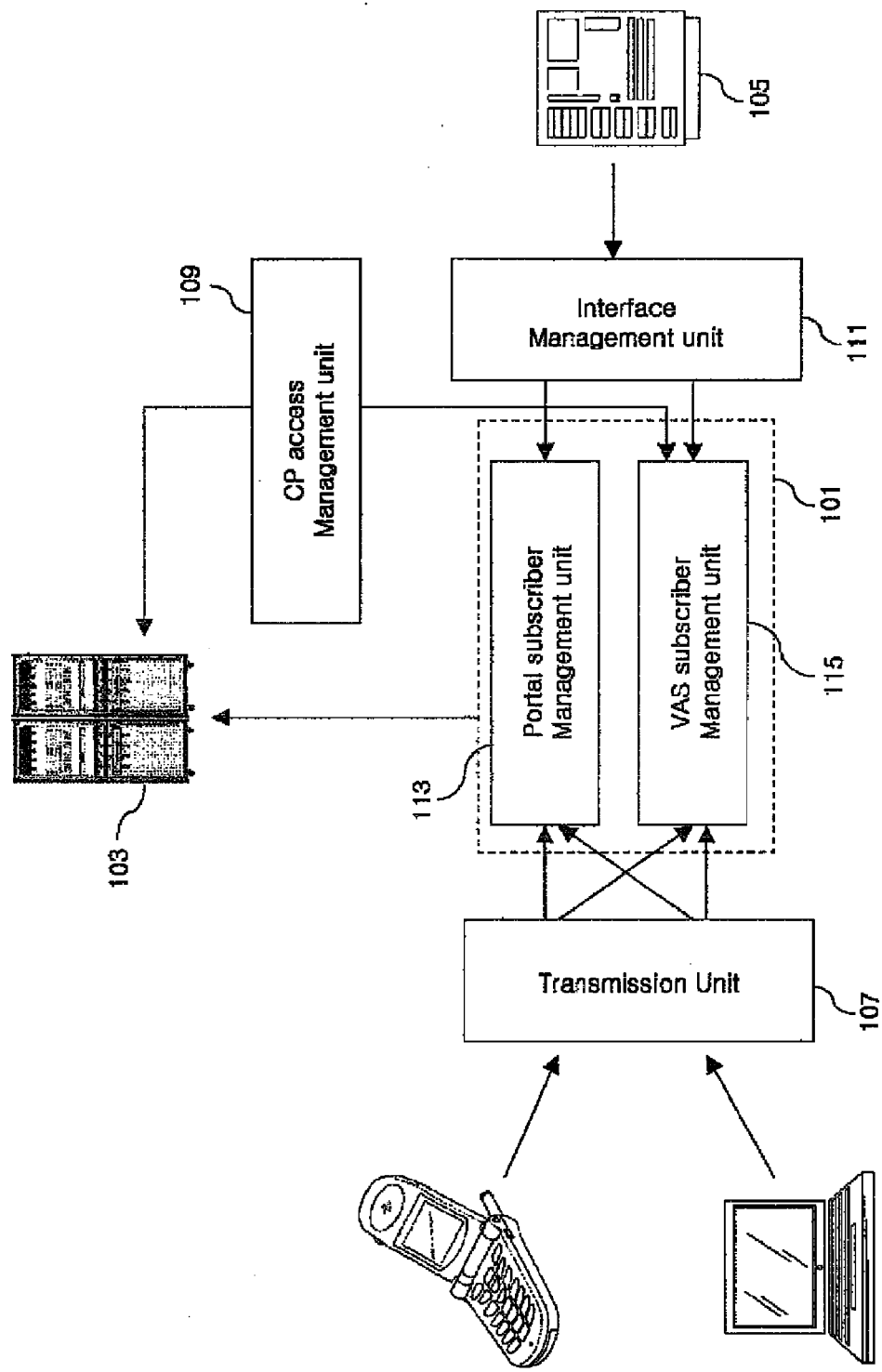

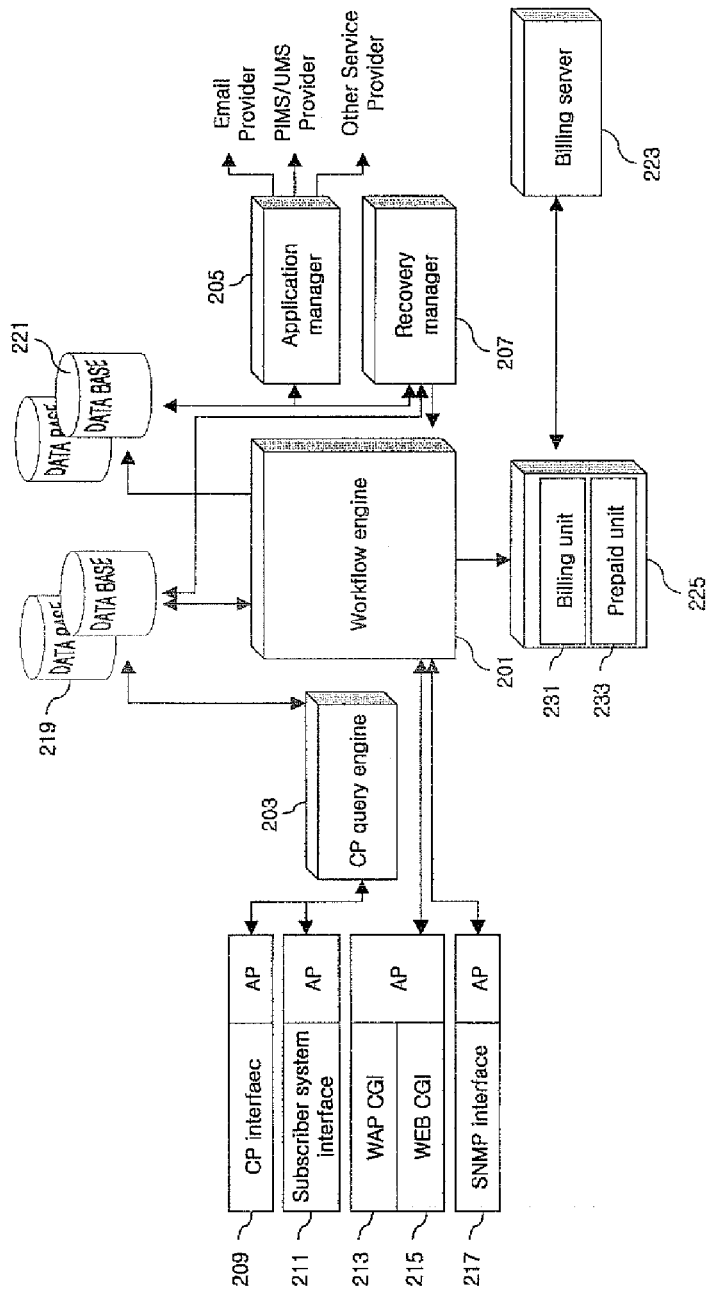
[Fig. 2]

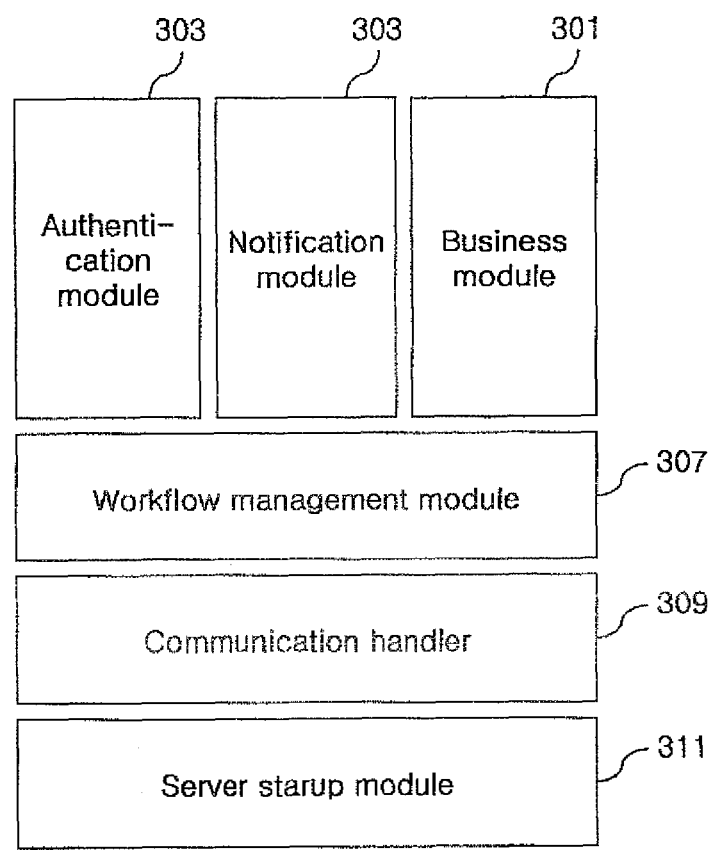
[Fig. 3]

[Fig. 4]
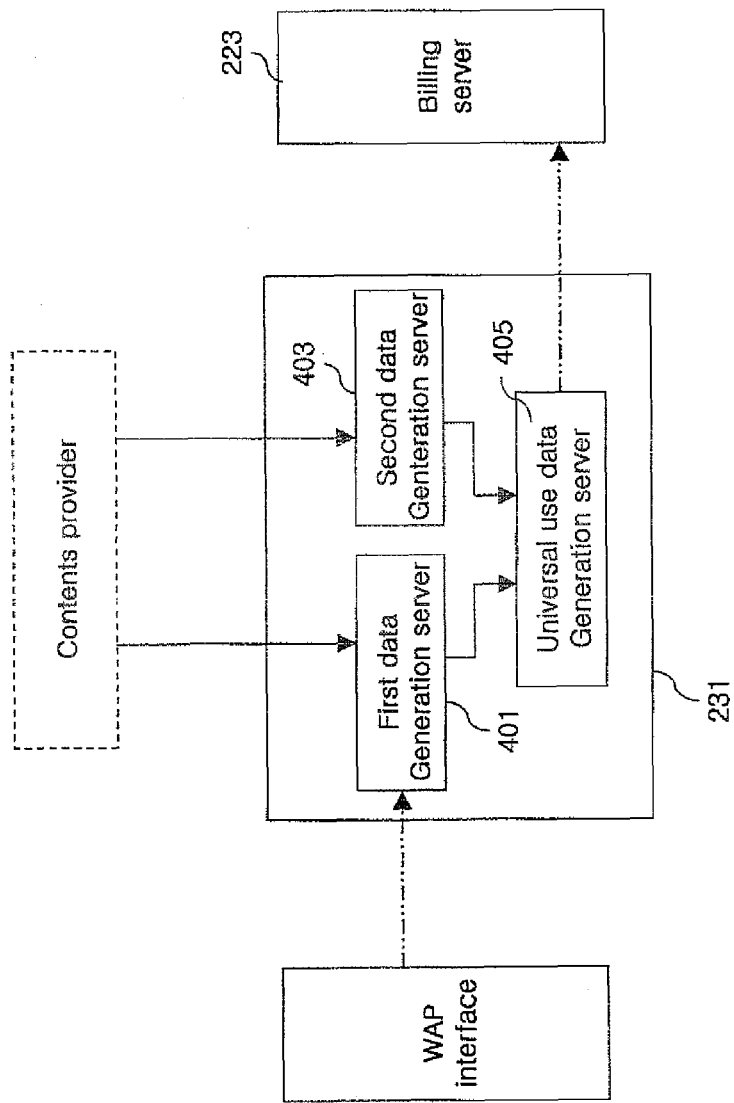

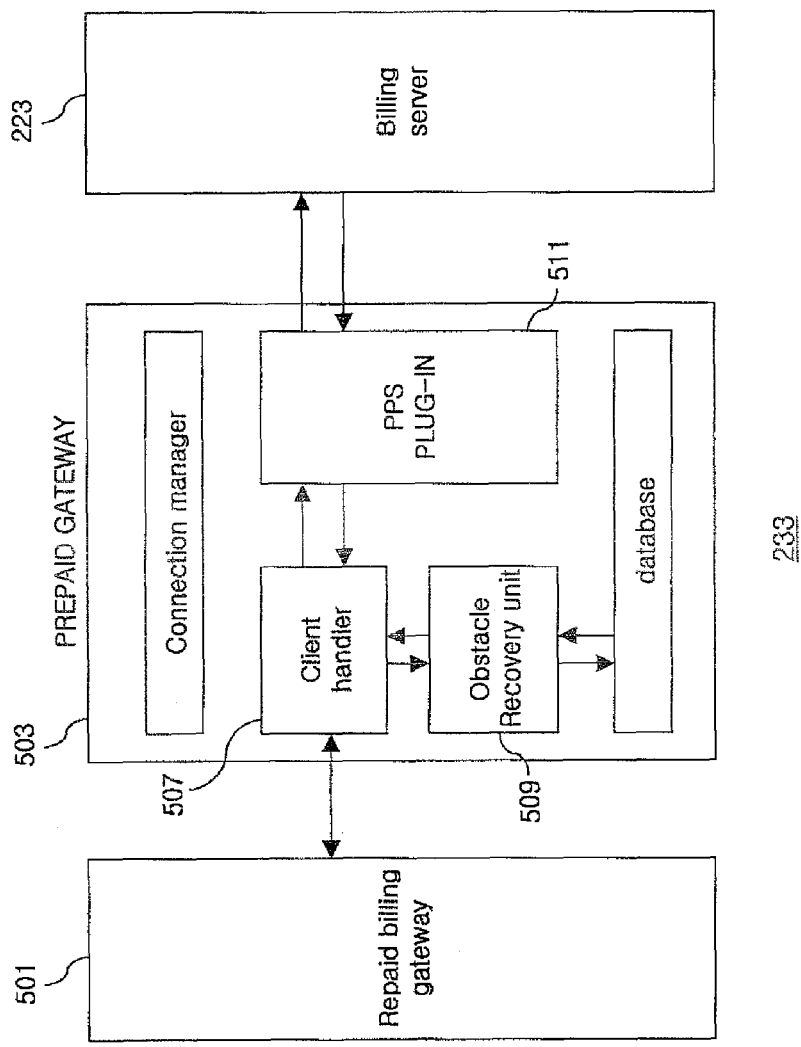
[Fig. 5]

[Fig. 6]
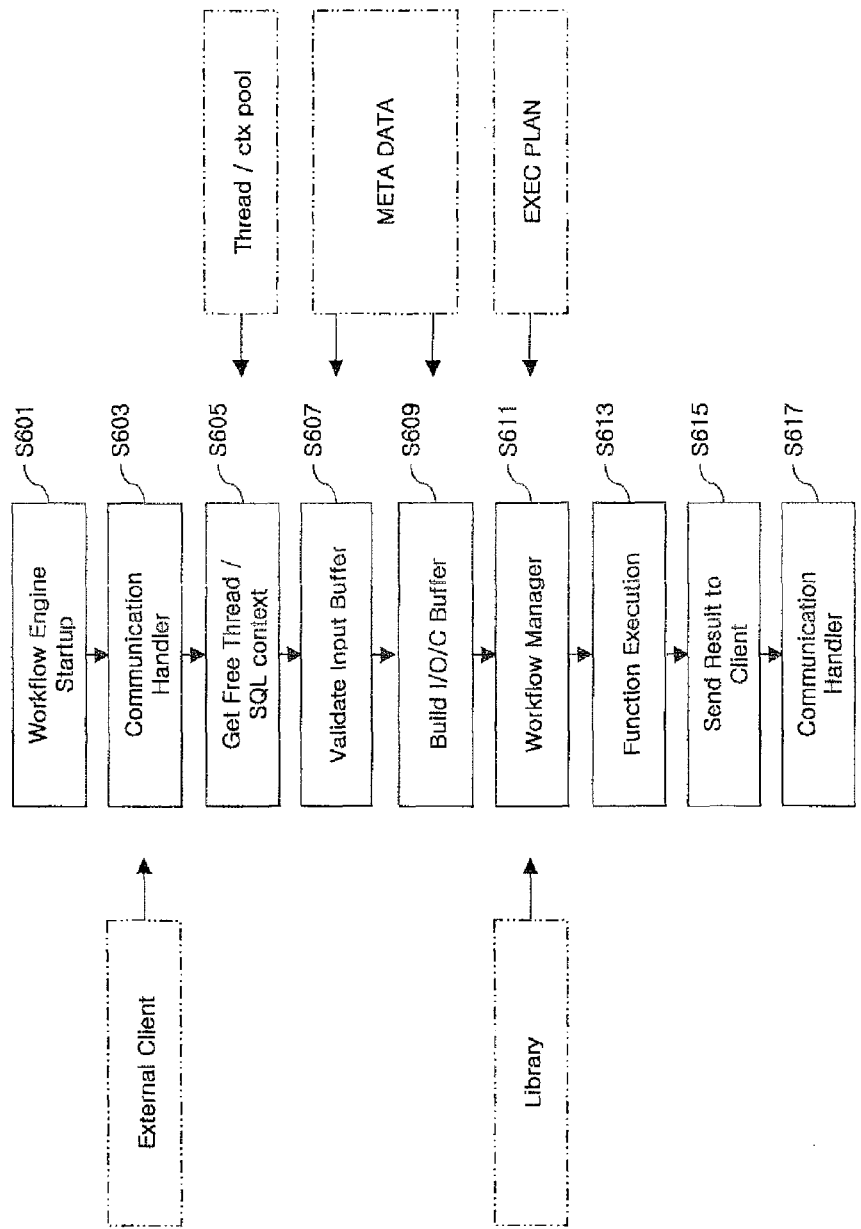

INTERFACE SYSTEM OF SUBSCRIBER INFORMATION MANAGEMENT, BILLING, PREPAID SYSTEM FOR MOBILE NETWORK SYSTEM, AND PREPAID METHOD USING THE INTERFACE SYSTEM

CROSS REFERENCE TO RELATED APPLICATION

This application is the National Phase application of International Application No. PCT/KR2005/002741, filed Aug. 19, 2005, which designates the United States and was published in English. This application, in its entirety, is incorporated herein by reference.

TECHNICAL FIELD

The present invention relates to a subscriber information management system of a mobile communication system, and more particularly, to a interface architecture of subscriber information management, billing, prepaid system for mobile network system, and a prepaid method using the interface architecture, which are applicable to the subscriber information management and the billing through a voice subscriber, a data subscriber and contents provider by embodying a Workflow Engine classified as a business logic and a processing logic to access the interface rapidly for clients.

BACKGROUND ART

Generally, in mobile communication network, a system integration means that it is embodied wholly through routine processor. Routine processor responds to various events to makes the user to feel only one system. In addition, the processor applies same principle to all environments including same/different unit.

The system integration explained above is classified as data integration and process integration, and the data integration aims to co-ownership and definition (production) of data presented scatteringly on various system. This data integration is sub-classified as logic step integration and physical step integration. The logic step integration is in the form that a consumer access to and consume data to co-owned by data producer, that is, data or information is co-owned by the producer and consumer. In physical step integration, data base is handled directly using ODBC or Native River used previously in many cases, or table is co-owned using a common API.

In addition, the process integration means the integration of data and Business Logic, and recently changes into focusing on Workflow. Various models are presented depending on environment and product. For example, in PC environment, OLE by MS company and OpenDoc by Apple company are representative. Meanwhile, recently a framework is provided that data and processor are integrated in the form of Object or Component using OMG mainly, CORBA or Object Broker.

DISCLOSURE OF INVENTION

Technical Problem

This framework stores various information on directory server, and functions to provide user with information stored to meet his request. This framework makes it possible to provide user with information rapidly and efficiently on communication network. Therefore, subscribers request various service. An operator of mobile communication system has a burden on meeting the respective request from the subscriber and contents provider who provides a terminal of subscriber with contents.

Technical Solution

To meet the above requirement, the operator of mobile communication system has to provide subscriber with service customer-made, interface to use intuitively and easily, infallibility of security and convenience of access, and, rapid access to contents and qualitative time use. In addition, the operator of mobile communication system has to provide a platform of terminal to meet the request from the contents providers. This platform is applied to the business and technical environment of contents provider rapidly and efficiently. This platform requests the framework to be developed. The framework has to provide subscriber with high qualitative and rapid service through proper application, for example, the function of addition, changes and deletion of terminal and subscribing, releasing and inquiring of additional service, including the producing, changing and inquiring of client information.

Advantageous Effects

An interface architecture of subscriber information management system for mobile communication system makes it possible to embody Processing Logic without Core deformation to respond rapidly to Business Logic and business case from Business Logic. The information of subscriber enrolled through interface groups and additional service subscribing of subscriber is registered, received, modified, produced, inquired, changed, enrolled, released, deleted and validated rapidly through business logic and processing logic. Therefore, the present invention provides effects on increasing the efficiency in subscribing procedures and using service on the ground that it is easily applicable to environment changes and changeable embodiment of it is possible.

In addition, the present invention makes it possible to unify and simplify the billing procedures which are complicated as a whole. Therefore, because each changing procedure of billing data related to is separated from each other totally, even a format is changed, residual modules are not effected therefrom.

Meanwhile, the present invention provides the obstacle solving tool. The obstacle solving tool provides a solution of obstacles on respective module between the prepaid billing client and the prepaid billing gateway, or between the prepaid billing gateway and the prepaid billing server.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings:

FIG. 1 illustrates a block diagram of a subscriber information management system in accordance with the present invention;

FIG. 2 illustrates a block diagram of an interface management unit in FIG. 1;

FIG. 3 illustrate diagrammatically a workflow engine;

FIG. 4 illustrate diagrammatically a billing unit associated with a workflow engine;

FIG. 5 illustrate a prepaid billing unit associated with a workflow engine in FIG. 2; and, FIG. 6 illustrate a flow chart to show a operation of the present invention.

BEST MODE FOR CARRYING OUT THE INVENTION

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

FIG. 1 illustrate a subscriber information management system and a interface management unit for interfacing the subscriber information in association with the subscriber information management system.

As shown in FIG. 1, the subscriber information management system comprises a subscriber management unit 101, which is composed of a portal subscriber management unit 113 for managing portal subscriber and an additional service subscriber management unit 115 for managing additional service subscriber, for registering the additional service and for managing the data subscriber received through the additional service subscriber management unit and voice subscriber received through Provisioning System 105, a Contents Provider (CP) access management unit 109 for accessing to the contents provided by contents provider and controlling it on the basis of request from subscriber terminal registered in additional service subscriber management unit 115 of the subscriber management unit 101, and, an interface management unit 111 for receiving, approving, registering, inquiring, billing, prepaid billing, etc. about the voice subscriber and data subscriber (subscriber enrolled through the additional service and subscriber through common WEB). In some embodiments, the subscriber information management system is an interface system comprising a computer system. The computer system of the interface system comprises at least one processor coupled to a memory for processing and/ or storing data. The processor is configured to access and execute a program in the memory. The executed program causes the processor to comprise the portal subscriber management unit 113, the subscriber management unit 101, the CP access management unit 109, and the interface management unit 111.

The subscriber management unit 101 allocates web, mobile and voice subscriber channel for the accessing of portal subscriber. The subscriber management unit 101 is associated with a delivery management unit 107 accessed to web and mobile communication network for the accessing of the additional service subscriber. In addition, the interface management unit 111 includes a plurality of provider accessed to from the outside, for example, Email Provider, Person Information Management System/Unified Message System (PIMS/UMS) Provider. The interface management unit 111 receives the subscriber information from the provider of other service.

For example, when the request of subscription is made from not portal subscriber but additional service subscriber, the predetermined information (web ID/pass word, a resident registration number) of the additional service subscriber is inputted to the interface management unit 111. On the basis of predetermined information, the interface management unit 111 validates the subscriber and registers him. The register procedures of portal subscriber to receive additional service are the same. For voice subscriber, the same procedures of subscription are presented through web and mobile.

Meanwhile, the interface management unit 111 performs the inquiry and validation on the basis of Lightweight Directory Access Protocol (LDAP). The interface management unit 111 performs the functions of registering the subscriber received through the additional service, and also receiving and registering the contents provider. The interface management unit 111 contains predetermined rule information presenting the subscription procedures and subscription information for voice subscriber and data subscriber.

Also, the interface management unit 111 establishes Common Information Module service on the basis of the request from clients. The CIM service supports Workflow presenting the LDAP association works, CP association works and Rule application, etc.

The Rule information manages CIM API (Application Programming Interface) for a plurality of external system. Not only the production/changes/inquiry of the client information (primary information, pass word, etc.), but also selective operation of information is possible through the rule information. Also, the comprehensive use of information changed and produced is possible through the rule information to support plural terminals per a client including addition/ changes/deletion of terminal. In addition, the subscription/ release/inquiry of VAS subscribed through contents provider and portal is applied selectively through the rule information. Thus, the rule information present the inquiry and validation of a system comprehensively.

The interface management unit 111 processes directly the billing which was done sporadically on each system. To this end, the interface presents a wireless portal platform which can unify and simplify the complicate procedures of the billing.

In addition, the interface management unit 111 presents the functions that the prepaid billing can be done regardless of the size of prepaid billing server which is not standardized. The interface management unit 111 includes a wireless portal platform to get rid of obstacles on respective module between the prepaid billing client and the prepaid billing gateway, or between the prepaid billing gateway and the prepaid billing server.

FIG. 2 illustrates a workflow mechanism for processing the client requests provided from the external system (subscriber system and contents system) with the interface management unit.

As sown in FIG., the interface management unit 111 consists of: A CP interface 209 for interfacing with the contents provider; a voice subscriber system interface 211 for receiving the voice subscriber information; a WAP interface 213 for accessing to the wireless to receive the subscriber information using the mobile; a WEB interface 215 for receiving the subscriber information using the wire terminal; a interface group containing a interface of a Simple Network Management Protocol (SNMP) for receiving the subscriber information with accessing to single network; a LDAP data base for storing the subscriber information of voice client; a subscriber data base 221 entraining the predetermined rule for storing the information of portal subscriber and value added subscriber, and for processing procedures of the subscription and validation in association with the workflow engine; a workflow engine 201 for inquiring the subscription state of subscriber on the basis of the LDAP data base and the subscriber data base, and for registering and managing the primary information and the information of value added service subscription about subscriber on the basis of the Rule; a billing system 225, in association with the workflow engine 201, for producing the total using data format about predetermined value added service including the using information of subscriber and price information according to contents using, and for processing the operation and management of billing and prepaid billing thereon; a billing server 223, in association with the billing system 225, for calculating the billing and prepaid billing, and for computing the deduction of the deposit of client; a Recovery Management 207 for storing the requests from a plurality of interface on error of the workflow engine 201, for re-working on the requests in releasing the error of workflow engine; and, a CP Query Engine 203 for raising a Query about validation requests received through the interface group 230.

Said billing system 225 consists of: a billing unit 231 for present a wireless portal platform to unify and simplify the billing procedures which was done sporadically on each system; and a prepaid billing unit 233 for performing the functions according to prepaid billing on wireless portal platform regardless of sizes of the prepaid billing server which are not standardized.

Also, the workflow engine 201 is in association with a Application Management 205 for supporting co-ownership of the information about Email Provider, personal information management system provider (PIMS/UMS Provider) and the provider of value added service including other services.

Meanwhile, said workflow engine 201 includes a Deployment Tool for inputting from a manager the Meta Data creation, library creation, function establishment and Rule of meta data, etc. about the clients Requests of CP management function, subscriber registering function and value added service management function. Said meta data is a part of the Deployment Tool of said workflow engine 201. Said Meta Data consists of each parameter for processing service request inputted from clients to API. Said library has the function of processing the workflow engine 201 about service request provided from clients. In addition, said Deployment Tool contains a Return Code. Said return code is in association the messages received in working of the workflow engine 201.

In the present invention, there is the service provision function that on the request transmitted through WEB and WAP from the external system, the corresponding service is provided. The said external system includes all system in association with NATE system including PS and CP.

In addition, with respect to the information requested from the clients such as mobile communication business man, said Rule processes inquiry and validation of input and output data on the basis of global standards, that is, Global Rule. In working of the workflow engine 201, said workflow engine 201 fetches the Rule from the subscriber data base 221 and entrain it on predetermined memory. On the basis of said rule, the workflow engine 201 performs the services of registering, acceptance, modification, creation, inquiry, changes, subscription, release, deletion, or billing, etc. of information about the subscriber and value added service of subscriber. The workflow engine, on the basis of said Deployment Tool, creates Meta Data and library about input and output data requested from clients. Said workflow engine 201 performs inquiry, validation and billing about the meta data and library on the basis of the corresponding Rule.

In addition, said SNMP interface 217 supports said workflow engine 201. Said SNMP interface 217 performs a point system management between servers, and confirmation and management of urgent error messages through email or SMS.

FIG. 3 illustrates a block diagram of a workflow engine in accordance to the present invention. FIG. 4 illustrates a block diagram of a billing unit in accordance to the present invention. FIG. 5 illustrates a block diagram of a prepaid billing unit in accordance to the present invention.

As depicted in drawings, the workflow engine consists of: a Server Startup Module 311 for fetching the data and Rule information necessary for initial starting of a workflow engine 201 from said subscriber data base and for transmitting them to internal memory; a Business Module 301 for performing process of Request about registered data on the basis of said rule information as applying to workflow engine 201; a Communication Handler 309 for performing the communication interfacing by allocating communication channel with PV, WEB, CP and WAP accessing to said interface group 230; a validation LDAP module 305 for validating and inquiring of the subscriber information on the basis of LDAP data base 219 in inputting and modifying subscriber information received from said communication handler 309; a workflow management module 307 for performing registering, validation and inquiry of the subscriber information, subscriber request information, contents provider and value added service received from said communication handler 309 on the basis of said rule information, and for creating the results therefrom; and a Notify CP module 303 for transmitting result information provided from said workflow management module 307 to contents provider or value added service provider.

Meanwhile, said billing unit 231, as depicted in FIG. 4, consists of: first and second data creation server 401, 403 for creating a using data format containing predetermined using information by using user log provided from said CP interface 230 and said WAP interface 213 by contents provider; a total using data server 405 for creating a total using data format which is made up of price information incurred from WAP using and predetermined information added to said using data, and for transferring it into billing data register format. Said billing server 223 calculates the billing using the billing data register format inputted from said total using data creation server 405.

In addition, said prepaid billing unit 233 consists of: a prepaid billing client for performing a billing after receiving information of the deposit of user and for outputting the billing data therefrom; and, a prepaid billing gateway 503 for receiving the billing data and outputting it after confirming client information. Said billing server 223 receives said data, performs billing calculation or deducts the deposit from client according to billing calculation.

Said prepaid billing gate way 503 consists of: a client handler 507 for receiving billing data in accordance to the predetermined standard promised with clients, and for outputting it after comparing with client information; and, prepaid billing service plug-in (PPS Plug-In) 511 for receiving the billing data from said clients handler 507 and for outputting said billing data to prepaid billing server 333, which works in accordance to the standards of billing server 223 to provide prepaid billing services regardless of kinds of billing server 223.

The operation of the present invention will be described in detail in accordance to drawing attached hereto as bellows.

FIG. 6 illustrates a flowchart for showing the main operation of the present invention. First, in step S601, said workflow engine 201 fetches rule information from the subscriber database 221 through server startup module 311. Said workflow engine 201 stores the rule information to internal memory.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An interface system of a subscriber information management, billing, and prepaid system for interfacing of a subscriber information management system for a mobile communication system, the interface system comprising a computer system,
the computer system comprising a memory and a processor coupled to the memory,
the processor configured to access and execute a program in the memory,
the executed program causing the processor to comprise a portal subscriber management unit, a subscriber management unit, a Contents Provider (CP) access management unit, and an interface management unit, wherein:
the portal subscriber management unit is configured to manage a portal subscriber;
the subscriber management unit is configured to manage an additional service subscriber; and
the CP access management unit is configured to control the access of one or more contents provided by a contents provider on the basis of a request from the additional service subscriber; and
the interface management unit configured is to accept, approve, and register a subscriber information including a portal subscriber information and an additional service subscriber information on the basis of a predetermined rule,
wherein the predetermined rule is associated with a workflow engine,
wherein the workflow engine is classified as a business logic and a processing logic,
wherein the business logic is a separate entity from the processing logic,
wherein the subscriber information is registered, received, modified, produced, inquired, changed, enrolled, released, deleted, or validated through the business logic and the processing logic, and
wherein the interface management unit is configured to perform a validation on the basis of a Lightweight Directory Access Protocol (LDAP), take a registration operation of the subscriber accepted through an additional service including an acceptance and registration of the contents provider, and keep predetermined rule information providing a voice subscriber and a data subscriber with subscribing procedures and subscribing information.

2. The interface system of the subscriber information management, billing, and prepaid system according to claim 1, wherein the subscriber information comprises at least one of web ID, pass word, or registration number of residence.

3. The interface system of the subscriber information management, billing, and prepaid system according to claim 1, wherein Common Information Module (CIM) services are built in the interface management unit to support workflows providing the subscriber with LDAP related works, Contents Provider (CP) related works, and Rule application.

4. The interface system of the subscriber information management, billing, and prepaid system according to claim 1, wherein the interface management unit comprises:
an interface group of a plurality of interfaces configured to receive the information of the portal subscriber and the additional service subscriber through wire communication and wireless communication networks;
a LDAP database configured to store the subscriber information of voice clients;
a subscriber database configured to store the information of the portal subscriber and the additional service subscriber, and the predetermined rule built in for performing the subscription procedures and the subscription validation of the subscriber associated with the workflow engine;
the workflow engine configured to inquire the current state of the subscriber on the basis of the LDAP database and the subscriber database, and for registering and managing the primary information of the subscriber and the information of additional service subscribed on the basis of the predetermined rule;
a Recovery Management configured to store the requests from a plurality of interfaces on an error of the workflow engine and to restart the works according to the requests in releasing the error of the workflow engine; and
a Contents Provider (CP) Query Engine configured to perform the query of a validation request received from the interface group.

5. The interface system of the subscriber information management, billing, and prepaid system according to claim 4, wherein the interface group is associated with the Contents Provider (CP) interface configured to interface with the contents provider, the voice subscriber system interface configured to input the information of the voice subscriber, the WAP interface configured to receive the subscriber information through a wireless access using a wireless terminal, the WEB interface configured to receive the data subscriber information using a wire terminal, and a Simple Network Management Protocol (SNMP) configured to receive the data subscriber information with accessing to a simple network.

6. The interface system of the subscriber information management, billing, and prepaid system according to claim 4,
wherein the workflow engine further comprises an Application Management configured to support co-ownership of additional service information; and
wherein the Application Management includes at least one of an Email Provider, Personal Information Management System Provider (PIMS/UMS Provider), or other service providers.

7. The interface system of the subscriber information management, billing, and prepaid system according to claim 4, wherein the workflow engine comprises a Deployment Tool configured to adjust the management of information imputed and the corresponding rules depending on External Systems and environment changes.

8. The interface system of the subscriber information management, billing, and prepaid system according to claim 7, wherein the Deployment Tool plays a role of producing of a Meta Data and a library about input and output data requested by the clients, and is a management input tool configured to provide validation and inquiry services on the basis of the corresponding rule.

9. The interface system of the subscriber information management, billing, and prepaid system according to claim 8, wherein the validation and inquiry services are capable of producing, changing and inquiring of client information, and are the management tools configured to establish functions of addition, change and deletion of the terminal, and to subscribe, release and inquire the additional services.

10. The interface system of the subscriber information management, billing, and prepaid system according to claim 4, wherein the predetermined rule performs a inquiry and a validation of the input and output data with a Global Rule about the information requested by the clients.

11. The interface system of the subscriber information management, billing, and prepaid system according to claim 10, wherein the validation and inquiry services are capable of producing, changing and inquiring client information, and are the management tools configured to establish functions of addition, change and deletion of the terminal, and to subscribe, release and inquire the additional services.

12. The interface system of the subscriber information management, billing, and prepaid system according to claim 4, wherein the workflow engine comprises:
   a Server Startup Module configured to fetch the data necessary for initial starting and the rule information from the subscriber database, and transmit them into an internal memory;
   a Business Module configured to process a Request of data registered on the basis of the rule information with applying the rule information to the workflow engine;
   a Communication Handler configured to perform communication interfacing by allocating communication channel with PV, WEB, Contents Provider (CP) and WAP accessing to the interface group;
   a validation LDAP module configured to inquire and approve the subscriber information on the basis of LDAP database in inputting and modifying of the subscriber information received from the communication handler;
   a workflow management module configured to process a request of subscriber information, subscriber request information, contents provider and additional service received from the communication handler on the basis of the rule information, and produce the corresponding results; and
   a notification module configured to transmit the result information provided from the workflow management module to the clients.

13. The interface system of the subscriber information management, billing, and prepaid system according to claim 4,
   wherein the workflow engine further comprises a billing system which produces a total use data format of a predetermined additional service including use information of subscriber and billing information according to use of contents, and performs an operation and a management of billing and prepaid on the basis of the total use data format; and
   wherein the billing system is associated with a billing server deducting a deposit from the client for accounting the billing and the prepaid.

14. The interface system of the subscriber information management, billing, and prepaid system according to claim 13, wherein the billing system comprises a billing unit configured to provide a wireless portal platform to unify and simplify the billing procedure; and
   a prepaid unit of the wireless portal platform, configured to perform the prepaid in the wireless portal platform regardless of prepaid server size which is not standardized.

15. The interface system of the subscriber information management, billing, and prepaid system according to claim 14, wherein the billing unit comprises:
   the first data production server configured to produce a use data format containing predetermined use information by using a user log from a WAP gate or contents provider;
   a billing unit configured to produce the total use data format in the use data, containing of billing information according to WAP use and predetermined information, and transfer it into billing data registering format; and
   a billing server configured to account billing, by using the billing data register format inputted from the billing unit.

16. The interface system of the subscriber information management, billing, and prepaid system according to claim 15, wherein the predetermined use information is user information (user ID), Uniform Resource Locator (URL) information used by user during special times (visiting time) and terminal information of user.

17. The interface system of the subscriber information management, billing, and prepaid system according to claim 15, wherein the predetermined information is any one of information of statistical value of using rate by user, the information updated to terminal recently, or preference information by user.

18. The interface system of the subscriber information management, billing, and prepaid system according to claim 17, wherein the predetermined information is the information of prepaying subscriber notifying whether a subscriber prepays or not to prevent the prepaying subscriber from double billing.

19. The interface system of the subscriber information management, billing, and prepaid system according to claim 15, wherein the billing unit comprises the second data production server configured to produce the use data format by inputting the user log from the content provider on the case only that the user log is not produced in WAP gateway or the content provider is reliable.

20. The interface system of the subscriber information management, billing, and prepaid system according to claim 14, wherein the billing unit comprises:
   a first data production server configured to produce a use data format containing the predetermined use information by using user log from WAP gateway or contents provider;
   a billing unit configured to output billing information according to WAP use; and
   a billing server configured to produce the total use data format containing of the billing information and the predetermined information and transferring it into billing data register format, and account the billing by using of the billing data register format inputted from the billing unit.

21. The interface system of the subscriber information management, billing, and prepaid system according to claim 20, wherein the predetermined use information is user information (user ID), Uniform Resource Locator (URL) information used by user during special times (visiting time) and terminal information of user.

22. The interface system of the subscriber information management, billing, and prepaid system according to claim 20, wherein the predetermined information is any one of information of statistical value of using rate by user, the information updated to terminal recently, or preference information by user.

23. The interface system of the subscriber information management, billing, and prepaid system according to claim 20, wherein the predetermined information is the information of prepaying subscriber notifying whether a subscriber prepays or not to prevent the prepaying subscriber from double billing.

24. The interface system of the subscriber information management, billing, and prepaid system according to claim 14, wherein the prepaid billing unit comprises:

a) a prepaid billing client configured to perform the billing after receiving the information of user deposit, and output the billing data therefrom;
b) a prepaid billing gateway configured to input the billing data outputted on the size promised with the prepaid billing client, and output the billing data after confirming client information; and
c) a prepaid billing server configured to account billing with inputting the billing data or to deduct the deposit of client according to the accounting of the billing.

25. The interface system of the subscriber information management, billing, and prepaid system according to claim 24, wherein
the prepaid billing gateway comprises:
b-1) a client handler configured to play a role as a middle medium between the prepaid billing client and the prepaid billing server, input the billing data outputted on the size promised with the prepaid billing client, and output the billing data after comparing with the client information; and
b-2) a prepaid billing service Plug-In (PPS Plug-In) configured to input the billing data of the client handler, and output the billing data to the server with operation depending on the server size to prepare services regardless of kinds of the prepaid billing server.

26. The interface system of the subscriber information management, billing, and prepaid system according to claim 24, wherein
the billing procedures is done by inquiring information of residual money of user, performing billing to terminal user, canceling the billing done and performing the billing reserved.

27. The interface system of the subscriber information management, billing, and prepaid system according to claim 24, wherein the billing procedures is not done by all of steps, but done selectively by all or a part of steps depending on state of the billing of user.

28. The interface system of the subscriber information management, billing, and prepaid system according to claim 24, wherein the prepaid billing gateway further comprises an obstacle solving unit configured to solve obstacles of respective module between the prepaid billing client and the prepaid billing gateway, or between the prepaid billing gateway and the prepaid billing server.

29. The interface system of the subscriber information management, billing, and prepaid system according to claim 28, wherein
in the obstacle solving unit, the billing data is transferred from the prepaid client to the prepaid gateway directly on the case that the use Option is not used.

30. The interface system of the subscriber information management, billing, and prepaid system according to claim 24, wherein the prepaid billing gateway further comprises a connection manager configured to control the respective unit function of the prepaid billing gateway.

31. A prepaid billing method using an interface system of a subscriber information management, billing, and prepaid system for a mobile communication system, wherein
the interface system comprises a computer system,
the computer system comprising a memory and a processor coupled to the memory,
the processor configured to access and execute a program in the memory,
the executed program causing the processor to comprise a portal subscriber management unit, a subscriber management unit, a Contents Provider (CP) access management unit, and an interface management unit, wherein:
the portal subscriber management unit is configured to manage a portal subscriber;
the subscriber management unit is configured to manage an additional service subscriber; and
the CP access management unit is configured to control the access of one or more contents provided by a contents provider on the basis of a request from the additional service subscriber; and
the interface management unit is configured to accept, approve, and register a subscriber information including a portal subscriber information and an additional service subscriber information on the basis of a predetermined rule,
wherein the predetermined rule is associated with a workflow engine,
wherein the workflow engine is classified as a business logic and a processing logic,
wherein the business logic is a separate entity from the processing logic,
wherein the subscriber information is registered, received, modified, produced, inquired, changed, enrolled, released, deleted, or validated through the business logic and the processing logic, and
wherein the interface management unit is configured to perform a validation on the basis of a Lightweight Directory Access Protocol (LDAP), take a registration operation of the subscriber accepted through an additional service including an acceptance and registration of the contents provider, and keep predetermined rule information providing a voice subscriber and a data subscriber with subscribing procedures and subscribing information; and
the prepaid billing method of a wireless portal platform comprises the steps of:
A) writing a prepaid billing data on a database without transmitting to a prepaid billing gateway when an obstacle solving unit of the interface system is configured to handle an obstacle of transmitting the prepaid billing data;
B) transmitting the prepaid billing data extracted from the database to a prepaid billing server; and
C) re-transmitting the prepaid billing data when an obstacle has occurred in the transmission of the prepaid billing data.

32. The prepaid billing method of the wireless portal platform according to claim 31, wherein the method comprises a step of transmitting the prepaid billing data directly to the prepaid billing gateway when the obstacle solving unit of the interface system is configured to ignore an error of transmitting the prepaid billing data.

33. The prepaid billing method of the wireless portal platform according to claim 31,
wherein in the step B), after transmitting the prepaid billing data, a state of the prepaid billing data is changed to Success instead of deleting it on the database.

34. The prepaid billing method of the wireless portal platform according to claim 31,
wherein in the step B), the state of the prepaid billing data is changed to Error where an obstacle is on transmitting the data to the prepaid billing server, and trying to re-transmit the data.

35. The prepaid billing method of the wireless portal platform according to claim 31, wherein a trial number of re-transmitting in the step C) is predetermined, and the state of the prepaid billing data is changed to Give-up and not transmitted where a re-transmitting number exceeds to the predetermined trial number.

36. The prepaid billing method of the wireless portal platform according to claim 35,
wherein after a Network Management Operator finds the reason to Give up, the prepaid billing data is transmitted by a lump.

* * * * *